Jan. 31, 1967    E. C. GLASSER    3,301,250
FLAMELESS HEATER, HEATING ASSEMBLY AND HEATING KIT
Filed March 26, 1965    2 Sheets-Sheet 1

Inventor
ERNEST C. GLASSER
By
Brangley, Baird, Clayton, Miller & Vogel
Attys.

United States Patent Office 3,301,250
Patented Jan. 31, 1967

3,301,250
FLAMELESS HEATER, HEATING ASSEMBLY AND HEATING KIT
Ernest C. Glasser, Deerfield, Ill., assignor to Sun-Pak Products, Inc., Chicago, Ill., a corporation of Illinois
Filed Mar. 26, 1965. Ser. No. 442,907
18 Claims. (Cl. 126—263)

The present invention relates to a flameless heater, a heating assembly and a heating kit incorporating therein the improved flameless heater.

An important object of the present invention is to provide an improved flameless heater of the type including a container or bag permeable to atmospheric oxygen and containing therein comminuted iron particles and a quantity of highly dissociable inorganic salt in an aqueous solution, whereby upon exposure of the bag and the contents thereof to the atmosphere, the atmospheric oxygen passing through the bag reacts with the iron particles in the presence of the inorganic salt in the aqueous solution to produce heat.

Another object of the invention is to provide an improved flameless heater of the type set forth wherein a quantity of expanded porous material, such as vermiculite, is disposed in the bag with the iron particles and the inorganic salt in the aqueous solution distributed thereover, whereby to prevent caking or lumping of the active ingredients during storage and use of the flameless heater.

In connection with the foregoing object, it is another object of the invention to provide an improved flameless heater of the type set forth wherein a longer useful heating life is provided for a given quantity of reactive materials and aqueous solution therein.

Still another object of the invention is to provide a flameless heater of the type set forth wherein after exhaustion of the activity thereof, the activity may be revived by adding additional aqueous solution thereto, whereby the flameless heater may be reactivated a large number of times.

Yet another object of the invention is to provide an improved heating assembly incorporating therein the improved flameless heater of the present invention disposed within a reflector in the form of a cylindrical sleeve, the reflector serving to reflect energy radiating from the flameless heater back into the heater to increase and preserve the high level of activity thereof.

A further object of the invention is to provide an improved heating kit including the improved flameless heater of the present invention, the reflector, and a plastic bag impermeable to atmospheric oxygen, whereby the flameless heater can be rendered active or inactive as desired and whereby the level of activity thereof when active can be enhanced.

Further features of the invention pertain to the particular arrangement of the parts and ingredients of the flameless heater and the heating assembly and the heating kit, whereby the above-outlined and additional operating features thereof are attained.

The invention, both as to its organization and method of operation, together with further objects and advantages thereof, will best be understood by reference to the following specification taken in connection with the accompanying drawings, in which.

Figure 1:
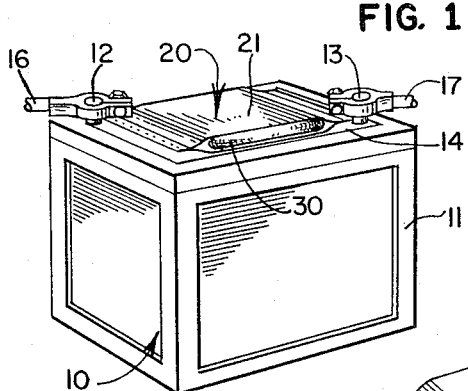
FIGURE 1 is a perspective view of an automobile storage battery having disposed thereon and in operative relationship therewith a heating assembly made in accordance with and embodying the principles of the present invention.

Although the flameless heater and heating assembly of the present invention are of general utility wherever a good supply of sustained heat is required, certain advantages of the invention are more fully realized when they are utilized in connection with the heating of automobile storage batteries, and accordingly, the invention will be described when so applied. There is illustrated in FIG. 1 of the drawings an automobile storage battery 10 having the usual casing 11, output terminals 12 and 13 and top 14, the terminals 12 and 13 being connected by cables 16 and 17, respectively, to various parts of the electrical system of an automobile to supply power therefor. As is well understood in the art, the electrical energy from the battery 10 is generated by a chemical reaction therein and it further is understood that the rate of electrical energy production is proportional to the rate of chemical reaction taking place in the battery 10, the rate of chemical reaction being in turn a function of temperature, the rate of chemical reaction essentially doubling for each 18° F. rise in temperature. As a consequence, when the ambient temperature falls to a low value on the order of 0° F. or below, the chemical activity within the battery 10 may be so low that it cannot generate the required electrical energy to operate the various components, such as the starter motor, connected to the output cables 16 and 17.

In accordance with the present invention, a heating assembly generally designated by the numeral 20 is placed upon the top 14 of the battery 10 to maintain the temperature therein at a sufficiently high level so that the chemical reactivity of the battery 10 is sufficient to generate electrical energy at a high rate sufficient to operate the starting motor and the other electrical equipment connected to the cables 16 and 17. More specifically, by utilizing the present invention, an ordinary automobile battery 10 can be rendered highly reactive even in sub-zero temperatures on the order of —30° F., so that the automobile carrying the battery 10 may be left outdoors in sub-zero weather and still have a high rate of electrical energy generation from the battery 10 to insure starting and proper operation thereof.

Figure 2:
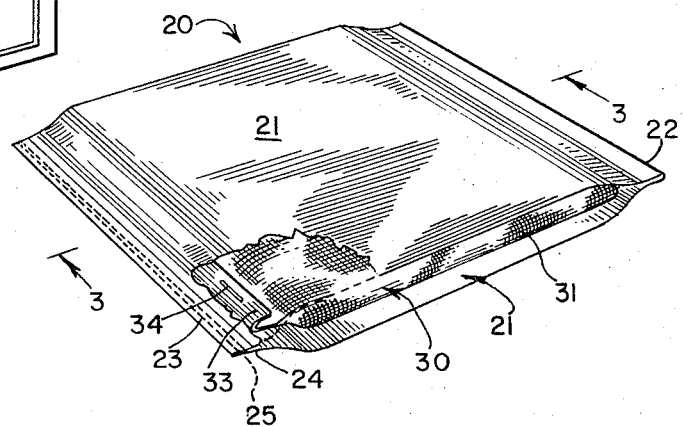
FIG. 2 is an enlarged perspective view of the heating assembly of FIG. 1 with a portion of the reflector thereof broken away to illustrate the flameless heater disposed therein and also made in accordance with and embodying the principles of the present invention.
Figure 3:
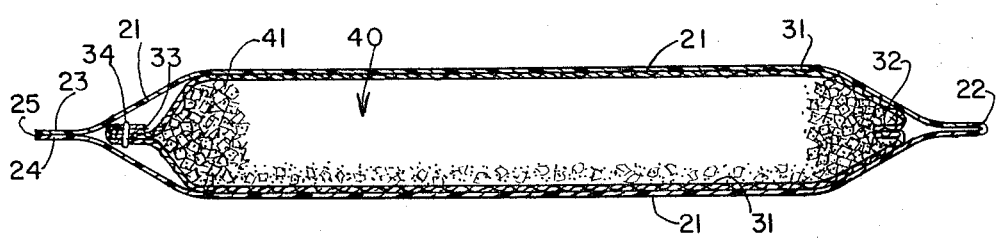
FIG. 3 is a further enlarged view in longitudinal section through the heating assembly of FIG. 2 along the line 3—3 thereof.
Figure 4:
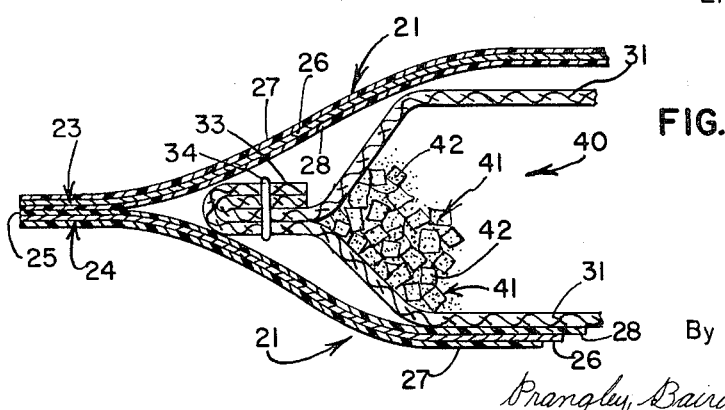
FIG. 4 is a still further enlarged fragmentary view in vertical section of one end of the heating assembly of FIG. 3.

The heating assembly 20 includes a generally cylindrical sleeve 21 surrounding a flameless chemical heater 30, the details of the sleeve 21 and the heater 30 being more fully illustrated in FIGS. 2 to 4 of the drawings. The reflector 21 is preferably formed from an elongated rectangular sheet of material folded at one end as at 22 and with the free ends 23 and 24 thereof overlying and sealed together as at 25, whereby to form a cylindrical sleeve within which can be slipped the flameless heater 30. Referring to FIG. 4, it will be seen that the sleeve 21 is preferably of 3-ply construction including an inner metallic layer 26 which is preferably formed of a highly reflective metal foil, and an outer layer 27 and an inner layer 28 of synthetic organic resin, respectively, the seal 25 preferably being formed by heat sealing the inner resin layer 28 to itself at the overlapped ends 23 and 24. The preferred metal for the foil layer 26 is aluminum, but any other suitable reflective and bendable metal may be substituted therefor, the preferred thickness of the foil layer 26 being 0.001 inch, it being understood that thinner layers on the order of 0.0001 inch may be utilized and thicker layers on the order of 0.01 inch may be utilized. The preferred synthetic organic resin for the layers 27 and 28 is polyethylene resin, although other suitable resins may be utilized in the place thereof; the preferred thickness of each of the resin layers 27 and 28 is 0.002 inch, although smaller thicknesses on the order of 0.0001 inch and greater thicknesses on the order of 0.01 inch may be utilized.

The flameless heater 30 includes a porous fabric bag 31 which contains therein the reactive ingredients. Preferably the bag 31 is formed of a rectangular piece of material folded as illustrated and sewn along one end (the right-hand end as viewed in FIG. 3) and one side (not shown) as at 32 to provide a bag open only at one end, the end disposed to the left as viewed in FIGS. 2, 3 and 4. After placement of the active ingredients and other materials within the bag 31, the left-hand end is folded upon itself as at 33 and suitable fasteners such as staples 34 are provided to close the left-hand end of the bag 31. The bag 31 is formed of any suitable pliable material with the requisite porosity to the atmospheric gases including atmospheric oxygen which is necessary to sustain the heat producing reaction within the bag 31. Suitable fabrics are porous papers, porous plastics and porous cloths. The preferable material is cotton drill cloth having 68 threads in the warp and 40 in the fill, it being understood that this construction provides a particular porosity to atmospheric oxygen which provides a specific rate of chemical reaction when the heater 30 is exposed to air, a courser cloth with a greater total porosity providing a greater rate of reaction and a finer cloth with a smaller total porosity providing a slower rate of reaction.

There is disposed within the bag 31 a mixture of active ingredients designated by the numeral 40 and including a plurality of chunks of expanded porous material 41 carrying thereon iron particles 42. In a preferred embodiment of the invention, the ingredients in the mixture 40 have the following proportions by weight:

TABLE 1

| Ingredient: | Parts by weight |
|---|---|
| Vermiculite | 1.0 |
| Iron particles (comminuted) | 24.0 |
| Ammonium chloride | 1.0 |
| Wetting agent | 0.15 |
| Water | 1.5 |

The above ingredients are premixed before placement in the porous bag 31; the ammonium chloride and the iron fillings are tumble mixed in a dry condition; the vermiculite and the wetting agent and the water are tumble mixed together until the mixture is of the consistency of wet sand; and then the dry mixture and the wet mixture are tumble mixed together until thoroughly mixed and then immediately dropped into the cloth bag 31. The cloth bag 31 has the open end thereof closed by folding as at 33 and applying the staples 34 therein. If atmospheric oxygen is admitted through the walls of the bag 31, the mixture will immediately begin to react, the oxygen from the air reacting with the iron filings in the presence of the electrolyte provided by the ammonium chloride dissolved in the water, the reaction producing iron oxides accompanied by the evolution of substantial quantities of heat. In the actual production of the flameless heater 30, the filled bag 31 is immediately sealed in an airtight plastic container, as will be described more fully hereinafter, so as to prevent any substantial reaction thereof with atmospheric oxygen.

The vermiculite in the mixture of Table 1 is highly important and serves as a carrier for the iron filings and the electrolyte solution formed by dissolving the ammonium chloride in the water with the wetting agent, the vermiculite having a high surface area per unit volume whereby the iron particles and the electrolyte are distributed as a thin film over a large surface area of the vermiculite so that a large portion of the reactive surface of the iron particles is available for contact with atmospheric oxygen to enter into the heat producing chemical reaction. This insures a high rate of chemical reactivity and an efficient use of all of the active ingredients, whereby to permit numerous reuses of the flameless heater 30 as will be described more fully hereinafter. The vermiculite is a foliated mineral consisting of an alteration product of biotite and other micas, whereby to have the high surface area per unit volume referred to above. The preferred product for use in the heater 30 is one having a bulk density of from about 5 to about 9 pounds per cubic foot, the preferred bulk density being about 7 pounds per cubic foot. Such material has a surface area of from about 4 to about 10 square meters per gram thereof as measured by the water adsorption method. The material has a dominant size in the range of from about 8 to about 30 mesh.

The iron particles in the formulation of Table 1 provide one of the active ingredients in the heat producing reaction, the rate of reaction being a function of the amount of surface area that the iron particles possess. It is preferred that the particle size be in the range from about 24 mesh to about 60 mesh. The ratio by weight between the iron particles and the vermiculite in the formulation can be varied from the ratio of 24 illustrated in Table 1, a ratio as low as 16 and as high as 32 being useful in the present invention.

The ammonium chloride in the formulation of Table 1 when dissolved in the water of the formulation provides an electrolyte to facilitate the reaction between the iron particles and the atmospheric oxygen. A technical grade of ammonium chloride having a content of 99.5% $NH_4Cl$ may be utilized, the material preferably being treated with tri-calcium phosphate to render it non-caking during the mixing operation. The ratio by weight between the ammonium chloride and the vermiculite in the formulation of Table 1 is one; the ratio may vary from about 0.75 to about 2.0 and still provide a useful formulation.

The preferred wetting agent in the formulation of Table 1 is that sold under the designation "Glycolsperse L-20" that is characterized by a specific gravity at 25° C. of 1.1, a saponification number of 39 to 52, a hydroxyl number of 96 to 114 and a viscosity at 25° C. of about 400, this wetting agent being soluble in water in all proportions. Another suitable wetting agent is that sold under the designation "Tween 20" which is sorbitan monolaurate. The ratio by weight between the water and the wetting agent in the formulation of Table 1 is 10 and the ratio by weight between the wetting agent and the vermiculite is 0.15; this latter ratio can be varied from as little as 0.01 to as much as 0.25 and still produce a useful formulation.

The water in the formulation of Table 1 is one of the ingredients in the electrolyte, the ratio by weight between the water and the vermiculite being 1.5 as illustrated; this ratio may vary from a value of 1.0 to as much as 2.5 and still produce a useful formulation.

It will be understood that in the formulation of Table 1, the water and the ammonium chloride and the wetting agent when combined provide an electrolyte which readily wets the surface of the iron particles to facilitate the reaction between the atmospheric oxygen and the iron particles on the surface thereof. The water also aids in adhering the iron particles to the vermiculite to insure distribution of the iron particles throughout the available surface area of the vermiculite.

Figure 5:
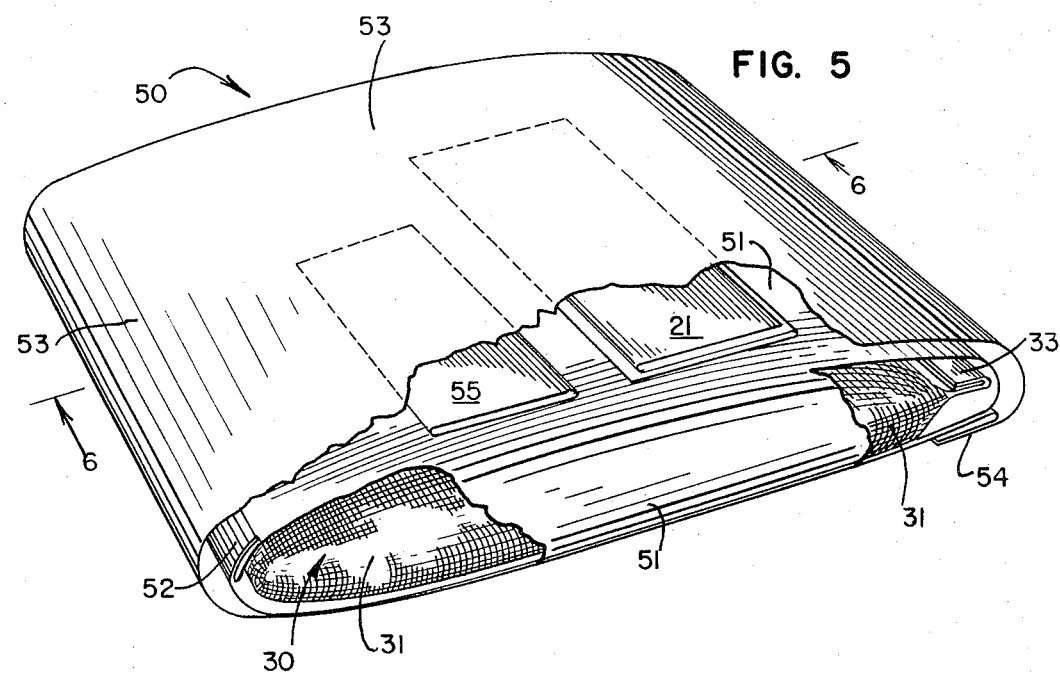
FIG. 5 is a perspective view with certain portions broken away of a heating kit made in accordance with and embodying the principles of the present invention, certain portions being broken away to illustrate the assembly thereof.
Figure 6:
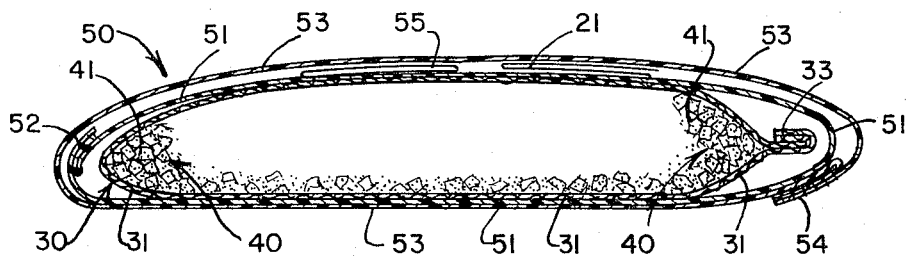
FIG. 6 is a view in vertical section through the heating kit of FIG. 5 along the line 6—6 thereof.

As has been noted above, immediately after the filling of the bag 31 with the reactive mixture 40 and the closure of the bag 31 by applying the staples 34, it is desirable to incorporate the resultant flameless heater 30 into a heating kit generally designated by the numeral 50 in FIGS. 5 and 6 of the drawings. In the heating kit 50, the flameless heater 30 is disposed within a plastic bag 51 which is of airtight construction and is sealed as at 52, whereby completely to surround and seal the heater 30 from atmospheric oxygen. The bag 51 containing the heater 30 is in turn disposed within an outer plastic bag 53 which has the open end thereof sealed as at 54. Also disposed within the bag 54 is the sleeve 21 in the folded condition thereof and a paper cup 55.

The inner plastic bag 51 is preferably of two-ply construction comprising a layer of cellulose resin and a layer of polyethylene resin, the two resin layers having a thickness of approximately 0.001 inch, respectively, it being understood that thinner layers on the order of 0.0001 and thicker layers on the order of 0.01 may be used. The outer plastic bag 53 is preferably formed of polyethylene resin and has a thickness of 0.002 inch, thinner sheets and thicker sheets being useful for this purpose since the outer bag 53 is used only to hold together the contents thereof.

In using the heating kit 50 to heat an automobile storage battery as illustrated in FIG. 1, the user first opens the outer bag 53, preferably by tearing the sealed end 54 thereof so that the sleeve 21 and the heater 30 and the cup 55 can be removed therefrom. The inner plastic bag 51 is then opened by opening the sealed end 52 thereof, but the heater 30 is kept therein and not removed therefrom, the opening of the bag 52, however, permitting atmospheric oxygen to enter and come into contact with the outer surface of the fabric bag 31. The user then kneads the heater 30 and the contents thereof to break up any lumps that may have formed therein during the storage and handling thereof. The kneading may be continued until slight heat is felt through the plastic bag 51. The heater 30 is then removed from the inner plastic bag and inserted into the reflector 21 after which the resultant heating assembly 20 is placed upon the battery 10 as illustrated in FIG. 1. At 60° ambient temperature, the surface of the reflector 21 will rise to a temperature of about 140° F., whereas at an ambient temperature of 0° F., the surface of the reflector 21 will rise to a temperature of about 95° F. These temperatures will be maintained for a period from about 10 to about 14 hours, whereby to maintain the battery 10 at a temperature above ambient so as to provide for increased electrical output therefrom. After the heating assembly 20 has served its purpose, the heater 30 is removed from the sleeve 21 and replaced in the inner plastic bag 51 and the bag 51 closed. The closely airtight bag 51 will prevent atmospheric oxygen from gaining access to the reactive agents within the heater 30 and the heat producing reaction will accordingly stop.

In the heating assembly 20, the sleeve 21 serves the important function of reflecting radiant energy emanating from the bag 31 back toward and into the bag to maintain the temperature thereof. It is understood that the rate of reaction and therefore the heat available from the heater 30 is a function of the temperature thereof, whereby the provision of the reflector 21 makes possible operation of the heater 30 at the temperatures noted above even in zero and sub-zero weather.

After about 10 to 14 hours of operation, the action of the heater 30 stops, fundamentally because of the loss of the water therefrom by evaporation. Activity of the heater 30 can be renewed by adding additional water thereto, about two parts by weight of water for each part by weight of vermiculite being satisfactory for this purpose. To this end the paper cup 55 has been provided which preferably has a size to hold just the required amount of water. To reactivate the heater 30, the cup 55 is filled with water and the water poured into the inner plastic bag 51 containing the heater 30 therein. The user kneads and massages the heater 30 until the water is absorbed therein, after which the heater 30 will again operate in the usual manner. The heater 30 can be recharged seven times or more in this manner by adding the requisite quantity of water to the inner bag 51 and kneading thereof into the materials 40 within the fabric bag 31.

It further will be understood that it is desirable that there be a substantial amount of surface area of the fabric bag 31 in relation to the volume of the contents 40 thereof so that there will be a good supply of atmospheric oxygen in relation to the iron particles available within the filler material 40. It is for this reason that the heater 30 is generally formed with a rectangular shape and a relatively small thickness compared to the length and width thereof. In a constructional example of the heating kit 50, the fabric bag 31 preferably has a length of seven inches and a width of five inches when folded flat, whereby when filled it has a length of about 6½ inches and a width of about 4½ inches and a thickness of about 1 inch. The mixture 40 within the bag 31 comprises one ounce of vermiculite having a bulk density of 7 pounds per cubic foot, 24 ounces of iron particles, one ounce of ammonium chloride, 1.5 ounces of water and 0.15 ounce of wetting agent. Preferably the fabric bag 31 is colored in an attractive color such as red and an odor mask is incorporated in the mixture 40 to give a pleasing odor to the heating kit 50. The airtight inner bag 51 has a length of 9 inches and a width of 6 inches, the reflector 21 has a length of 7½ inches and a width of 6 inches, the outer bag 53 has a length of 10 inches and width of 7 inches, and the paper cup 55 has a capacity of 2 ounces, whereby each refill of water is approximately 2 ounces.

From the above it will be seen that there has been provided an improved flameless heater, an improved heating assembly and an improved heating kit which fulfill all of the objects and advantages set forth above. More specifically, there has been provided an improved heater wherein the active ingredients thereof are distributed upon the surface of an expanded porous material, namely vermiculite, whereby to prevent caking or lumping of the active ingredients during storage and use thereof; as a result there is a longer useful life of the heater for a given quantity of reactive materials and aqueous solution therein. After exhaustion of the initial activity of the heater, it can be reactivated or refilled by adding an additional quantity of water thereto, whereby the flameless heater can be reactivated a substantial number of times, i.e., on the order of seven or more. There further has been provided an improved heating assembly utilizing the improved flameless heater disposed within a reflector in the form of a cylindrical sleeve, the reflector serving to reflect energy radiating from the flameless heater back into the heater to increase and preserve the level thereof at a relatively high value. Further an improved heating kit including the flameless heater and the reflector has been provided, the kit including a plastic bag impermeable to atmospheric oxygen, whereby the flameless heater can be rendered active or inactive by removal from or insertion in the impermeable plastic bag.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A flameless heater comprising a porous fabric bag permeable to the atmospheric gases including oxygen, a quantity of vermiculite disposed in said bag and completely surrounded thereby, comminuted iron particles disposed in said bag and substantially uniformly distributed about and upon said vermiculite, a quantity of highly dissociable inorganic salt disposed in said bag and substantially uniformly distributed about and upon said vermiculite and said iron particles, and an aqueous solution containing a wetting agent disposed in said bag and substantially uniformly distributed about and upon said vermiculite and said iron particles and said inorganic salt, whereby upon exposure to the atmosphere of said bag and the contents thereof the atmospheric oxygen passing through said bag reacts with said iron particles in the presence of said inorganic salt and said aqueous solution to produce heat.

2. A flameless heater comprising a porous fabric bag permeable to the atmospheric gases including oxygen, a quantity of vermiculite disposed in said bag and completely surrounded thereby, comminuted iron particles disposed in said bag and substantially uniformly distributed about and upon said vermiculite, a quantity of ammonium chloride salt disposed in said bag and substantially uniformly distributed about and upon said vermiculite and said iron particles; and an aqueous solution containing a wetting agent disposed in said bag and substantially uniformly distributed about and upon said vermiculite and said iron particles and dissolving said ammonium chloride, whereby upon exposure to the atmosphere of said bag and the contents thereof the atmospheric oxygen passing through said bag reacts with said iron particles in the presence of said aqueous solution to produce heat.

3. A flameless heater comprising a porous fabric bag permeable to the atmospheric gases including oxygen, a quantity of vermiculite disposed in said bag and completely surrounded thereby, said vermiculite having a density in the range from about 5 to about 9 pounds per cubic foot thereof, comminuted iron particles disposed in said bag and substantially uniformly distributed about and upon said vermiculite, said iron particles having a size in the range from about 24 to about 60 mesh, a quantity of ammonium chloride salt disposed in said bag and substantially uniformly distributed about and upon said vermiculite and said iron particles, and an aqueous solution containing a wetting agent disposed in said bag and substantially uniformly distributed about and upon said vermiculite and said iron particles and dissolving said ammonium chloride, whereby upon exposure to the atmosphere of said bag and the contents thereof the atmospheric oxygen passing through said bag reacts with said iron particles in the presence of said aqueous solution to produce heat.

4. A flameless heater comprising a porous fabric bag permeable to the atmospheric gases including oxygen, a quantity of vermiculite disposed in said bag and completely surrounded thereby, said vermiculite having a density in the range from about 5 to about 9 pounds per cubic foot thereof, comminuted iron particles disposed in said bag and substantially uniformly distributed about and upon said vermiculite, said iron particles having a size in the range from about 24 to about 60 mesh, the ratio by weight between said iron particles and said vermiculite being in the range from about 16 to about 32, a quantity of ammonium chloride salt disposed in said bag and substantially uniformly distributed about and upon said vermiculite and said iron particles, and an aqueous solution containing a wetting agent disposed in said bag and substantially uniformly distributed about and upon said vermiculite and said iron particles and dissolving said ammonium chloride, whereby upon exposure to the atmosphere of said bag and the contents thereof the atmosphere oxygen passing through said bag reacts with said iron particles in the presence of said aqueous solution to produce heat.

5. A flameless heater comprising a porous fabric bag permeable to the atmospheric gases including oxygen, a quantity of vermiculite disposed in said bag and completely surrounded thereby, said vermiculite having a density in the range from about 5 to about 9 pounds per cubic foot thereof, comminuted iron particles disposed in said bag and substantially uniformly distributed about and upon said vermiculite, said iron particles having a size in the range from about 24 to about 60 mesh, the ratio by weight between said iron particles and said vermiculite being in the range from about 16 to about 32, a quantity of ammonium chloride salt disposed in said bag and substantially uniformly distributed about and upon said vermiculite and said iron particles, the ratio by weight between said ammonium chloride salt and said vermiculite being in the range from about 0.75 to about 2.0, and an aqueous solution containing a wetting agent disposed in said bag and substantially uniformly distributed about and upon said vermiculite and said iron particles and dissolving said ammonium chloride, whereby upon exposure to the atmosphere of said bag and the contents thereof the atmospheric oxygen passing through said bag reacts with said iron particles in the presence of said aqueous solution to produce heat.

6. A flameless heater comprising a porous fabric bag permeable to the atmospheric gases including oxygen, a quantity of vermiculite disposed in said bag and completely surrounded thereby, said vermiculite having a density in the range from about 5 to about 9 pounds per cubic foot thereof, comminuted iron particles disposed in said bag and substantially uniformly distributed about and upon said vermiculite, said iron particles having a size in the range from about 24 to about 60 mesh, the ratio by weight between said iron particles and said vermiculite being in the range from about 16 to about 32, a quantity of ammonium chloride salt disposed in said bag and substantially uniformly distributed about and upon said vermiculite and said iron particles, the ratio by weight between said ammonium chloride salt and said vermiculite being in the range from about 0.75 to about 2.0, and an aqueous solution containing a wetting agent disposed in said bag and substantially uniformly distributed about and upon said vermiculite and said iron particles and dissolving said ammonium chloride, the ratio by weight between the water in said aqueous solution and said vermiculite being in the range from about 1.0 to about 2.5, the ratio by weight between said wetting agent and said vermiculite being in the range from about 0.15 to about 0.25, whereby upon exposure to the atmosphere of said bag and the contents thereof the atmospheric oxygen passing through said bag reacts with said iron particles in the presence of said aqueous solution to produce heat.

7. The flameless heater set forth in claim 6, wherein the ratio by weight between said iron particles and said vermiculite is about 24, the ratio by weight between said ammonium chloride salt and said vermiculite is about 1.0, the ratio by weight between the water in said aqueous solution and said vermiculite being about 1.5, and the ratio by weight between said wetting agent and said vermiculite being about 0.15.

8. A heating assembly comprising a porous fabric bag permeable to the atmospheric gases including oxygen, a quantity of expanded inorganic porous material of large surface area per volume thereof disposed in said bag and completely surrounded thereby, comminuted iron particles disposed in said bag and substantially uniformly destributed about and upon said porous material, a quantity of highly dissociable inorganic salt disposed in said bag and substantially uniformly distributed about and upon said porous material and said iron particles, an aqueous solution containing a wetting agent disposed in said bag and substantially uniformly distributed about and upon said porous material and said iron particles and said inorganic salt, and a reflector in the form of a cylindrical sleeve disposed about said bag and the contents thereof to reflect energy radiating from said bag back toward said bag, whereby upon exposure to the atmosphere of said bag and the contents thereof through the open ends of said sleeve the atmospheric oxygen passing through said bag reacts with said iron particles in the presence of said aqueous solution to produce heat.

9. A heating assembly comprising a porous fabric bag permeable to the atmospheric gases including oxygen, a quantity of vermiculite disposed in said bag and completely surrounded thereby, comminuted iron particles disposed in said bag and substantially uniformly distributed about and upon said vermiculite, a quantity of ammonium chloride salt disposed in said bag and substantially uniformly distributed about and upon said vermiculite and said iron particles, an aqueous solution containing a wetting agent disposed in said bag and substantially uniformly distributed about and upon said vermiculite and said iron particles and dissolves said ammonium chloride, and a reflector in the form of a cylindrical sleeve disposed about said bag and the contents thereof to reflect energy radiating from said bag back toward said bag, said reflector being of laminated structure including an aluminum foil inner sheet having the surfaces thereof coated with a synthetic organic plastic resin, whereby upon exposure to the atmosphere of said bag and the contents thereof through the open end of said sleeve the atmospheric oxygen passing through said bag reacts with said iron particles in the presence of said aqueous solution to produce heat.

10. A heating assembly comprising a porous fabric bag permeable to the atmospheric gases including oxygen, a quantity of vermiculite disposed in said bag and completely surrounded thereby, said vermiculite having a density in the range from about 5 to about 9 pounds per cubic foot thereof, comminuted iron particles disposed in said bag and substantially uniformly distributed about and upon said vermiculite, said iron particles having a size in the range from about 24 to about 60 mesh, a quantity of ammonium chloride salt disposed in said bag and substantially uniformly distributed about and upon said vermiculite and said iron particles, an aqueous solution containing a wetting agent disposed in said bag and substantially uniformly distributed about and upon said vermiculite and said iron particles and dissolving said ammonium chloride, and a reflector in the form of a cylindrical sleeve disposed about said bag and the contents thereof to reflect energy radiating from said bag back toward said bag, said reflector being of laminated structure including an aluminum foil inner sheet having the surfaces thereof coated with a synthetic organic plastic resin, whereby upon exposure to the atmosphere of said bag and the contents thereof through the open ends of said sleeve the atmospheric oxygen passing through said bag reacts with said iron particles in the presence of said aqueous solution to produce heat.

11. A heating assembly comprising a porous fabric bag permeable to the atmospheric gases including oxygen, a quantity of vermiculite disposed in said bag and completely surrounded thereby, said vermiculite having a density in the range from about 5 to about 9 pounds per cubic foot thereof, comminuted iron particles disposed in said bag and substantially uniformly distributed about and upon said vermiculite, said iron particles having a size in the range from about 24 to about 60 mesh, the ratio by weight between said iron particles and said vermiculite being in the range from about 16 to about 32, a quantity of ammonium chloride salt disposed in said bag and substantially uniformly distributed about and upon said vermiculite and said iron particles, the ratio by weight between said ammonium chloride salt and said vermiculite being in the range from about 0.75 to about 2.0, an aqueous solution containing a wetting agent disposed in said bag and substantially uniformly distributed about and upon said vermiculite and said iron particles and dissolving said ammonium chloride, and a reflector in the form of a cylindrical sleeve disposed about said bag and the contents thereof to reflect energy radiating from said bag back toward said bag, said reflector being of laminated structure including an aluminum foil inner sheet having the surfaces thereof coated with a synthetic organic plastic resin, whereby upon exposure to the atmosphere of said bag and the contents thereof through the open end of said sleeve the atmospheric oxygen passing through said bag reacts with said iron particles in the presence of said aqueous solution to produce heat.

12. A heating assembly comprising a porous fabric bag permeable to the atmospheric gases including oxygen, a quantity of vermiculite disposed in said bag and completely surrounded thereby, said vermiculite having a density in the range from about 5 to about 9 pounds per cubic foot thereof, comminuted iron particles disposed in said bag and substantially uniformly distributed about and upon said vermiculite, said iron particles having a size in the range from about 24 to about 60 mesh, the ratio by weight between said iron particles and said vermiculite being in the range from about 16 to about 32, a quantity of ammonium chloride salt disposed in said bag and substantially uniformly distributed about and upon said vermiculite and said iron particles, the ratio by weight between said ammonium chloride and said vermiculite being in the range from about 0.75 to about 2.0, an aqueous solution containing a wetting agent disposed in said bag and substantially uniformly distributed about and upon said vermiculite and said iron particles and dissolving said ammonium chloride, the ratio by weight between the water in said aqueous solution and said vermiculite being in the range from about 1.0 to about 2.5, the ratio by weight between said wetting agent and said vermiculite being in the range from about 0.5 to about 2.0, and a reflector in the form of a cylindrical sleeve disposed about said bag and the contents thereof to reflect energy radiating from said bag back toward said bag, said reflector being of laminated structure including an aluminum foil inner sheet having the surfaces thereof coated with a synthetic organic plastic resin, whereby upon exposure to the atmosphere of said bag and the contents thereof through the open ends of said sleeve the atmospheric oxygen passing through said bag reacts with said iron particles in the presence of said aqueous solution to produce heat.

13. A flameless heating kit comprising a heater including a porous fabric bag permeable to the atmospheric gases including oxygen, a quantity of expanded inorganic porous material of large surface area per volume thereof disposed in said fabric bag and completely surrounded thereby, comminuted iron particles disposed in said fabric bag and substantially uniformly distributed about and upon said porous material, a quantity of highly dissociable inorganic salt disposed in said fabric bag and substantially uniformly distributed about and upon said porous material and said iron particles, an aqueous solution containing a wetting agent disposed in said fabric bag and substantially uniformly distributed about and upon said porous material and said iron particles and said inorganic salt, a plastic bag completely surrounding said fabric bag and being impervious to the atmospheric gases including oxygen and sealing said fabric bag therefrom, and a reflector in the form of a cylindrical sleeve to be disposed about said fabric bag and the contents thereof to reflect energy radiating from said fabric bag back toward said fabric bag, whereby said heater is inactive and non-heating while sealed in said plastic bag and upon exposure to the atmosphere of said fabric bag and the contents thereof the atmospheric oxygen passing through said fabric bag reacts with said iron particles in the prsence of said inorganic salt and said aqueous solution to produce heat that is contained and preserved by said reflector disposed thereabout.

14. A flameless heating kit comprising a heater including a porous fabric bag permeable to the atmospheric gases including oxygen, a quantity of expanded porous material disposed in said fabric bag and completely surrounded thereby, comminuted iron particles disposed in said fabric bag and substantially uniformly distributed about and upon said porous material, a quantity of highly dissociable inorganic salt disposed in said fabric bag and substantially uniformly distributed about and upon said porous material and said iron particles, an aqueous solution containing a wetting agent disposed in said bag and substantially uniformly distributed about and upon said porous material and said iron particles and said inorganic salt, a first plastic bag completely surrounding said fabric bag and being impervious to the atmospheric gases including oxygen and sealing said fabric bag therefrom, a second plastic bag surrounding said first plastic bag to provide protection therefor, and a reflector in the form of a cylindrical sleeve disposed in said second plastic bag and to be disposed about said fabric bag and the contents thereof to reflect energy radiating therefrom back towards said fabric bag, whereby said heater is inactive and non-heating when sealed inside first plastic bag and upon exposure to the atmosphere of said fabric bag and the contents thereof the atmospheric oxygen passing through said fabric bag reacts with said iron particles in the presence of said inorganic salt and said aqueous solution to produce heat that is contained and preserved by said reflector disposed thereabout.

15. The flameless heating kit set forth in claim 14, wherein said first plastic bag is of laminated structure including a layer of polyethylene plastic firmly adhered to a layer of cellulose plastic, said second plastic bag is formed of polyethylene plastic, and said reflector is of laminated structure including a sheet of aluminum foil coated with polyethylene plastic.

16. A flameless heater comprising, a porous fabric bag permeable to the atmospheric gases including oxygen, a quantity of expanded inorganic porous material of large surface area per volume thereof disposed in said bag and completely surrounded thereby, comminuted iron particles disposed in said bag and substantially uniformly distributed about and upon said porous material, and a quantity of highly dissociable inorganic salt disposed in said bag and substantially uniformly distributed about and upon said porous material and said iron particles, whereby upon the introduction of an aqueous solution into said bag and upon exposure to the atmosphere of said bag and the contents thereof the atmospheric oxygen passing through said bag reacts with said iron particles in the presence of said inorganic salt and the aqueous solution to produce heat.

17. The flameless heater set forth in claim 16, wherein said porous material is vermiculite.

18. The flameless heater set forth in claim 16, and further comprising an aqueous solution containing a wetting agent disposed in said bag and substantially uniformly distributed upon said porous material and said iron particles and said inorganic salt.

References Cited by the Examiner

UNITED STATES PATENTS

| 858,848 | 7/1907 | Allison | 126—263 |
| 1,609,958 | 12/1926 | Perrault | 126—263 |
| 1,659,185 | 2/1928 | Baker | 126—263 |
| 2,157,169 | 5/1939 | Foster | 126—263 |
| 2,935,983 | 5/1960 | Reik | 126—263 |

CHARLES J. MYHRE, *Primary Examiner.*